United States Patent [19]
Anderson

[11] 3,866,648
[45] Feb. 18, 1975

[54] MICROFILM COPY JACKET
[75] Inventor: Thomas P. Anderson, Hubbard Woods, Ill.
[73] Assignee: Microseal Corporation, Evanston, Ill.
[22] Filed: May 11, 1971
[21] Appl. No.: 142,213

[52] U.S. Cl. .................. 150/39, 40/159, 206/456, 220/DIG. 31, 229/56
[51] Int. Cl. .......................................... A45c 11/18
[58] Field of Search .............. 150/392; 229/41, 56; 206/39, 40.5, DIG. 34; 220/DIG. 31; 40/158 R, 159, 104.19

[56] References Cited
UNITED STATES PATENTS
| | | | |
|---|---|---|---|
| 2,154,510 | 4/1939 | King et al. | 229/56 X |
| 2,635,665 | 4/1953 | Ashley | 229/56 X |
| 2,964,794 | 12/1960 | Peilstocker et al. | 206/DIG. 34 |
| 3,047,139 | 7/1962 | Jacoff | 206/56 AB |
| 3,207,420 | 9/1965 | Navarrete-Kindelan | 229/56 |
| 3,299,928 | 1/1967 | Inkley | 150/39 |
| 3,429,718 | 2/1969 | Helms | 229/56 X |
| 3,468,731 | 9/1969 | Obeda | 220/DIG. 31 |

Primary Examiner—William I. Price
Assistant Examiner—Stephen P. Garbe
Attorney, Agent, or Firm—Hill, Gross, Simpson, Van Santen, Steadman, Chiara & Simpson

[57] ABSTRACT

Microfilm jacket formed of transparent plastic film and having multiple film pockets defined by parallel bonding lines formed by fusion of the plastic films together. The bonding lines terminate inwardly of the outer edges of jacket to prevent tearing of the jacket along the bonding lines from the outer edges of the jacket.

4 Claims, 3 Drawing Figures

PATENTED FEB 18 1975 3,866,648

MICROFILM COPY JACKET

FIELD OF THE INVENTION

Transparent microfilm jacket for carrying microfilm strip in a series of parallel transparent pockets for viewing, copying and enlarging.

BACKGROUND, SUMMARY AND OBJECTS OF THE INVENTION

Microfilm jackets (particularly for use with 16 mm. film) are now in wide use in the microfilm industry. Such jackets are generally formed of a pair of transparent plastic films which are open along their side edges but which have a plurality of film pockets formed therein by parallel bonding lines which are spaced apart a distance only very slightly greater than the top-to-bottom dimension of the microfilm to be inserted in the pockets. The bonding lines are formed either by gluing the films together, by gluing each of the films to a thin strip of paper or cardboard which is sandwiched between the two films or by heat or sonic sealing of the films together in the well known manner.

Such jackets are stored in files and carry the microfilm for scanning or copying and enlarging by photographic or other processes. The pockets of the jackets may be loaded from time to time with strips or frames of film from the edges of the jackets and the jackets are then stored vertically in drawers, as a rule, until they are later required. Continuous use of the jackets involving particularly removal and replacement of the jackets from their drawer storage subjects the jackets to tearing from the edges of the jackets along the seal lines. This happens of course because the seal lines caused by heat or sonic fusion of the films is relatively weaker than the surrounding two ply jacket material. When such tearing occurs it becomes necessary to remove the microfilm stored in the old jacket and place in into new jackets.

It has been found that if the beginning of a jacket tear at the edge of the jacket can be prevented, such tearing can be substantially reduced and for all practical purposes practically eliminated. This can be achieved by having a two ply jacket thickness exposed along the entire length of both side edges of the jacket with the bonding lines terminated just slightly inwardly of the outer edges of the jacket. When the bonding lines run all the way to the very edge of the jacket, a tear can start right at the jacket edge and run along the bonding line. By terminating the fused bonding line short of the jacket edge a two ply jacket thickness is always exposed at the edge and the tendency for a tear to start is substantially reduced.

The present invention therefore provides a non-tearing multiple pocket microfilm jacket for carrying strips or frames of microfilm in preselected arrangement for scanning, copying, and enlarging without removal of the microfilm from the pockets.

A principal of the invention resides in the provision of a transparent microfilm jacket having a plurality of film pockets defined by a series of parallel fused bonding lines which bonding lines terminate short of the side edges of the jacket in order to eliminate tearing of the jacket from the jacket edges along those bonding lines.

Other objects feature and advantages of the present invention will become apparent from time to time as the following specification proceeds and with reference to the accompanying drawings.

DESCRIPTION OF PREFERRED EMBODIMENTS OF INVENTION

Figure 1:
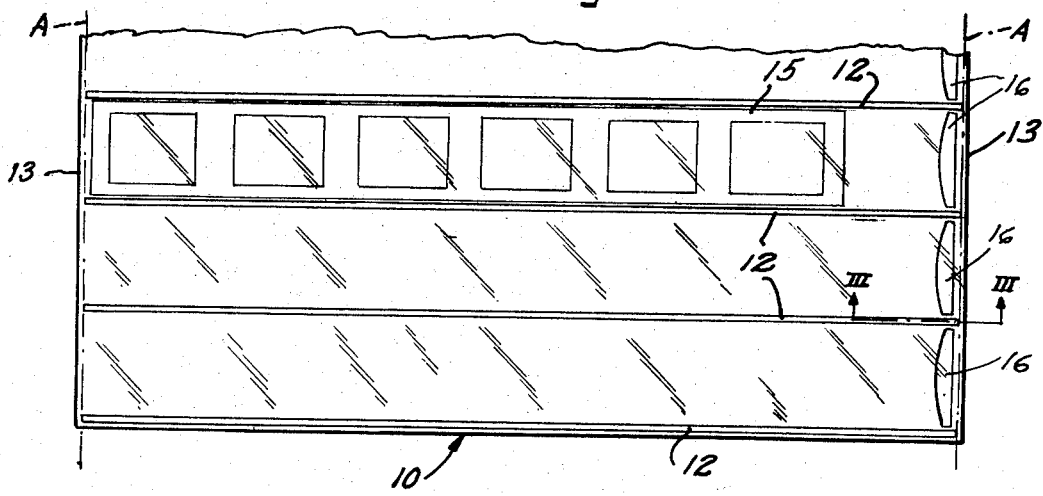
FIG. 1 is a plan view of a microfilm jacket constructed in accordance with the principles of the present invention.
Figure 2:
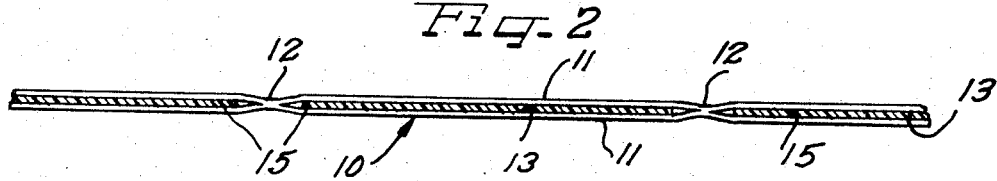
FIG. 2 is a fragmentary vertical sectional view of a microfilm jacket showing film strips within the jacket.

In FIG. 1 there is shown a microfilm jacket 10 constructed in accordance with the principles of the present invention which is formed from two plies or sheets 11 of transparent plastic film. The sheets may be made from any suitable tough transparent plastic film but are preferably made from a polyester film known in the trade as "Mylar" and produced by E. I. duPont de Nemours & Co. The sheets of polyester film are sealed or bonded together along a series of parallel spaced bonding lines 12—12 to define microfilm receiving pockets 13 between the seal lines. The pockets have a dimension between adjacent bonding lines only slightly greater than the height of microfilm strip 15 which is designed to be inserted in the pockets through entry slots 16 so that the inserted film will be carried in a fixed position within the pockets and will not have any tendency to move about. Microfilm characteristically has a thickness on the order of 3 to 5.5 mils and the thickness of the films making up the jacket are substantially less than that. For instance the back film of the two-ply jacket may be something on the order of one-half to one mil and the face film may be approximately 3 mils.

The sealing lines 12—12 are preferably formed by heat or sonic sealing so that the two films are fused together at their point of contact to define the lines 12—12 with the overall thickness of the jacket at the point of fusion along the bonding lines being approximately equal to the combined thickness of the two welded films depending on the evenness or unevenness of the weld.

Sonic sealing of a type commonly used to seal polyester film has proven to be a satisfactory form of seal due to its ability to permit the sealing along fine or narrow lines.

Figure 3:
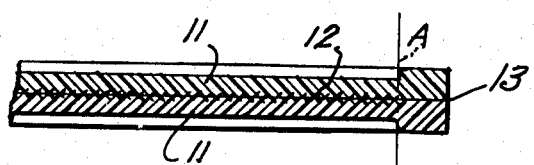
FIG. 3 is a sectional view taken substantially along line III-III of FIG. 1.

Irrespective of the particular means employed to fuse the two plies of the jacket together, an important aspect of the invention resides in the arrangement whereby the bonding lines terminate at points spaced inwardly from the two side edges 13, 13 of the jacket. In FIGS. 1 and 3 the seal lines 12—12 are shown as terminating at each edge of the jacket at a point A which is spaced slightly inwardly of the outer edges of the jacket. In the preferred embodiment shown, the jacket has an overall length of approximately 6" and the bonding lines terminate at each edge approximately 1/32 of an inch inwardly of the outer edges of the jacket.

As may be seen in FIG. 3, with the seal lines terminating inwardly of the outer edges of the jacket, the fused bonding lines are not exposed to the outer jacket edges and a two-ply jacket thickness presents itself there. As a consequence, when such jackets are filed for storage and one pulls out the jacket from the file a large number of times and handles the jacket a great deal, the tendency for the jacket to tear along the bonding line will be markedly reduced.

I claim as my invention:

1. A non-tearing multiple-pocket microfilm jacket having a pair of opposed generally parallel edges comprising:

a pair of thin transparent plastic films, one overlying the other, said films being attached to one another by parallel longitudinally extending spaced bonding lines between said films, said bonding lines being formed by fusion of said films to one another to define a plurality of elongated side-by-side film retaining pockets extending the length of said jackets to receive strips of photographic film, said bonding lines being generally perpenduclar to said edges, the thickness of the jacket along said bonding lines being less than the combined thicknesses of two unbonded plies of the film, said plies being unattached between said bonding lines along at least one of said edges said bonding lines terminating at their ends inwardly of said edges to present a two-ply thickness along said edges thereby preventing tearing of the films along said bonding lines upon the placing and removal of microfilm therein or upon the application of manual handling forces on the jacket transverse to the bonding lines.

2. A microfilm jacket constructed in accordance with claim 1 wherein said bonding lines are formed by a sonic sealing process and said films are transparent polyester.

3. The microfilm jacket of claim 1 wherein the bonding lines terminate inwardly of both side edges of the film jacket a distance greater than 1/32 inch.

4. The microfilm jacket of claim 1 wherein the bonding lines terminate inwardly of both side edges of the film jacket a distance on the order of 1/32 inch.

* * * * *